US005169578A

United States Patent [19]

Fukao

[11] Patent Number: 5,169,578

[45] Date of Patent: Dec. 8, 1992

[54] METHOD FOR PRODUCING AND METHOD OF USING SLIP CASTING MOLD

[75] Inventor: Kaname Fukao, Inuyama, Japan

[73] Assignee: NGK Insulators, Inc., Japan

[21] Appl. No.: 584,613

[22] Filed: Sep. 19, 1990

[30] Foreign Application Priority Data

Sep. 19, 1989 [JP] Japan ............ 1-243193

[51] Int. Cl.[5] ............ C04B 33/28

[52] U.S. Cl. ............ 264/56; 264/86; 264/220; 264/225; 264/226; 264/227

[58] Field of Search ............ 264/86, 225, 226, 56, 264/220, 227

[56] References Cited

U.S. PATENT DOCUMENTS

| | | | |
|---|---|---|---|
| 2,172,466 | 9/1939 | Edwards | 264/225 |
| 3,568,723 | 3/1971 | Sowards | 138/143 |
| 4,338,272 | 7/1982 | Pelton | 264/225 |
| 4,867,662 | 9/1989 | Shimahara | 264/225 |
| 4,913,868 | 3/1990 | Ito | 264/225 |

FOREIGN PATENT DOCUMENTS

| | | |
|---|---|---|
| 0329511 | 8/1989 | European Pat. Off. |
| 1-241368 | 9/1989 | Japan |

*Primary Examiner*—James Derrington

*Attorney, Agent, or Firm*—Parkhurst, Wendel & Rossi

[57] ABSTRACT

A slip casting mold suitable to be used for the production of a hollow ceramic article for insert casting can be easily produced by a method wherein granules having an average grain size of at least 30 μm are adhered to the surface of a mold to produce a mold having a 10 point average surface roughness $R_z$ of at least 30 μm, and the resulting mold is used in the production of the slip casting mold.

2 Claims, 3 Drawing Sheets

METHOD FOR PRODUCING AND METHOD OF USING SLIP CASTING MOLD

BACKGROUND OF THE INVENTION a) Field of the Invention

This invention relates to a method for producing a slip casting mold to be used for the production of a hollow ceramic article for insert casting, which is used in an exhaust gas system of an internal combustion engine, and a method for producing a hollow ceramic article for insert casting by the use of the slip casting mold.

b) Related Art Statement

There has been known a method, wherein the an internal surface of an exhaust port or exhaust manifold, which constitutes the exhaust gas system of an internal combustion engine of an automobile, is lined with a hollow ceramic article, and the exhaust gas temperature is raised by the adiabatic effect of the ceramic article, whereby the purifying the action of a catalyst for purifying exhaust gas is enhanced. Such a hollow ceramic article is generally insert cast in a cast metal, such as aluminum or the like, concurrently with the production of a cylinder head and the like.

However, when such hollow ceramic article is insert cast in a cast metal, such as aluminum or the like, a high compression stress acts on the hollow ceramic article due to shrinkage of the melted metal, and the hollow ceramic article may be broken. In order to obviate these drawbacks, a method has been proposed, wherein the outside of a hollow ceramic article is wrapped with an elastic material to relax the compression stress formed in the article; a method wherein the strength of a hollow ceramic article itself is improved; and the like. However, a satisfactory result has not yet been obtained in a hollow ceramic article having an elliptic cross-sectional shape which has partly a concave shape. The reason is that an excess tensile stress is generated in the concave portion. Particularly, when a sliding phenomenon is caused between the ceramic article and a cast metal, the metal is peeled off from the ceramic article, and further the tensile stress is concentrated in the concave portion, and hence such a hollow ceramic article is apt to be easily broken.

As an effective means for preventing the sliding phenomenon between a ceramics article and a metal, the inventor has proposed in Japanese Patent Laid-open Application No. 1-241,368, a method for producing a hollow ceramics article by means of a slip or casting mold having an inner surface roughened by sandblasting. However, it has been discovered in an investigation carried out later that, although a hollow ceramic article produced through the molding of a ceramic by means of a slip casting mold, whose inner surface had been roughened by sandblasting, has improved adhesion with a metal, the hollow ceramic article is large in dimensional dispersion, and hence the article has a problem fitting with other members, and other problems.

The object of the present invention is to solve the above described problems and to provide a method which can greatly increase the surface roughness of a hollow ceramics article to increase the adhesion of the ceramic article with metal without increasing its dimensional dispersion, whereby the stress concentration in the hollow ceramic article can be relaxed.

The inventor has made various investigations in order to attain the above described object and discovered that the object can be attained by a method wherein a slip casting mold itself, which is used for the production of a hollow ceramic article, is not treated by sandblasting or the like, but a particular treatment is carried out in the production of a mold to be used for the production of the slip casting mold. In the specification, claims and abstract of this invention, the term "mold" is used as a general term for master model, a so-called master mold and case mold produced by transferring the master mold, as explained later. That is, the term "mold" may have a meaning of master model, master mold or case mold.

SUMMARY OF THE INVENTION

One of the features of the present invention lies in a method for producing a slip casting mold to be used for the production of a hollow ceramic article for insert casting, comprising adhering granules to the surface of a mold, which corresponds to the surface shape of the hollow ceramic article for insert casting, to produce a mold having a 10 point average surface roughness $R_z$ of at least 30 μm, and producing the slip casting mold by the use of the above treated mold.

Another feature of the present invention lies in a method for producing a hollow ceramic article for insert casting, wherein a ceramic raw material is molded into a green hollow ceramic article by the use of the above obtained slip casting mold, and the green hollow ceramic article is fired.

DESCRIPTION OF THE PREFERRED EMBODIMENT

The present invention will be explained in more detail referring to the accompanying drawings.

Figure 1:
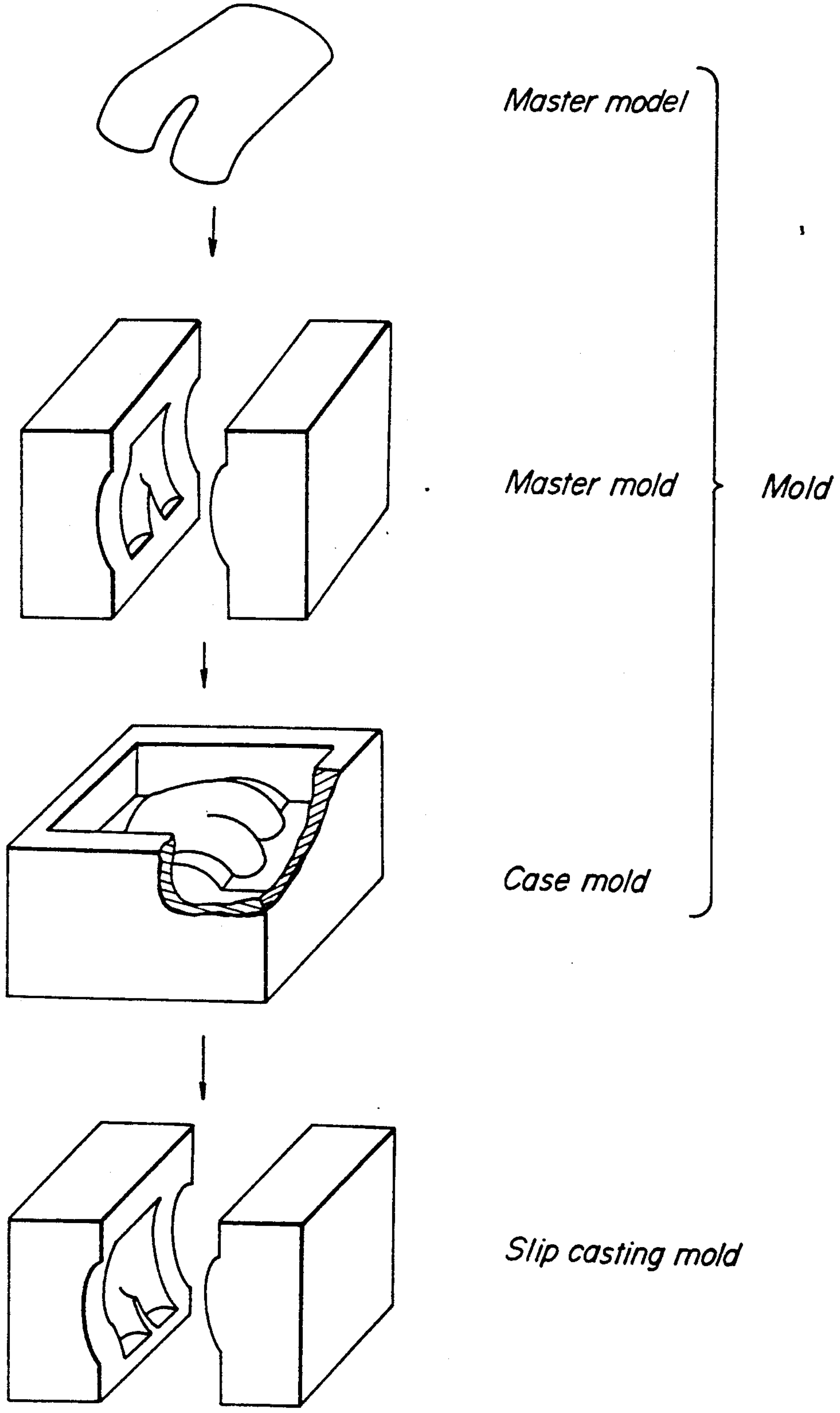
FIG. 1 is a diagrammatic view illustrating general steps in the production of a slip casting mold from a master model through a so-called master mold and a case mold obtained by transferring the master mold.

Referring to FIG. 1, a slip casting mold is generally produced from a master model through a master mold and a case mold produced by transferring the master mold.

The treating method of the present invention can be applied to any of the master model, master mold and case mold. However, the present invention will be explained hereinafter with respect to an embodiment wherein the case mold is treated, in order to explain the present invention in a simple manner.

Figure 2:
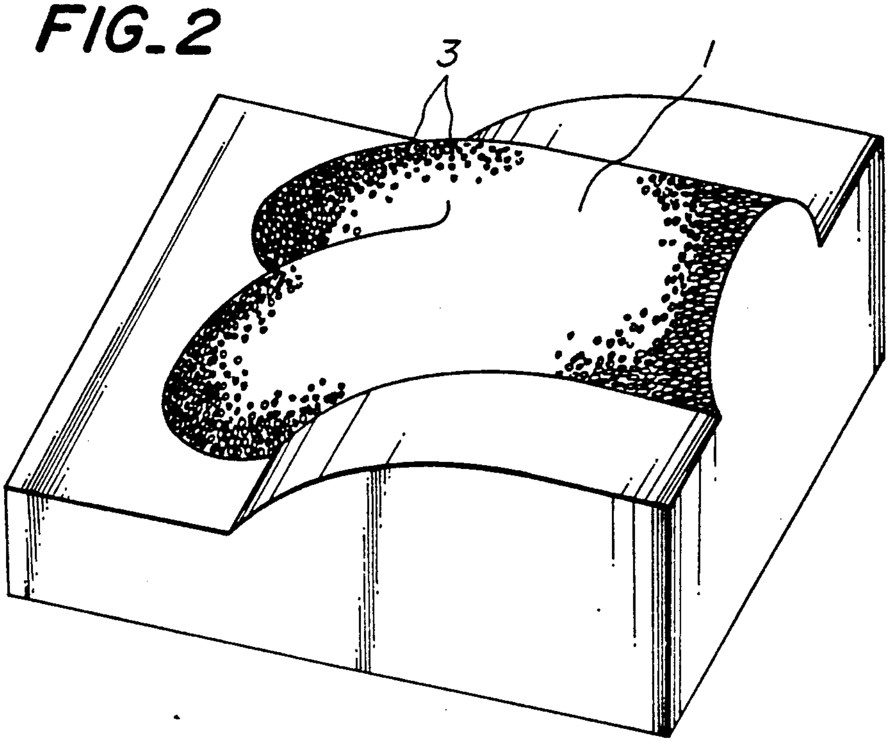
FIG. 2 is a perspective view illustrating a mold which has granules adhered in one layer to its surface according to the present invention.

A case mold 1 illustrated in FIG. 2, which corresponds to the surface shape of a port liner consisting of a hollow ceramic article for insert casting, is produced from gypsum or the like in the same manner as in a conventional method. The thus obtained case mold 1 is a case mold having a small dimensional dispersion so as to be used for the production of a slip casting mold 2, which is used in the production of a hollow ceramic article for insert casting.

In the present invention, granules 3 are adhered to the surface of a case mold 1, which corresponds to the mold area, to give a 10 point average roughness $R_z$ of at least 30 $\mu$m to the surface. As the granule 3, ceramic abrasive grains or the like are used. The 10 point average surface roughness $R_z$ of at least 30 $\mu$m can be advantageously formed by a method, wherein an adhesive is previously applied to the surface of a case mold 1, granules 3 having an average grain size of at least 30 $\mu$m are spread thereon, and granules not adhered thereto are removed. The reason why the 10 point average surface roughness $R_z$ is set to at least 30 $\mu$m is that a hollow ceramic article 4 for insert casting produced by using a case mold 1 having a surface having a 10 point average roughness $R_z$ of less than 30 $\mu$m is poor in the adhesion of the surface to a metal. Further, when granules 3 are adhered to the surface of a case mold 1 in one layer, a smaller dimensional dispersion can be maintained.

Figure 3:
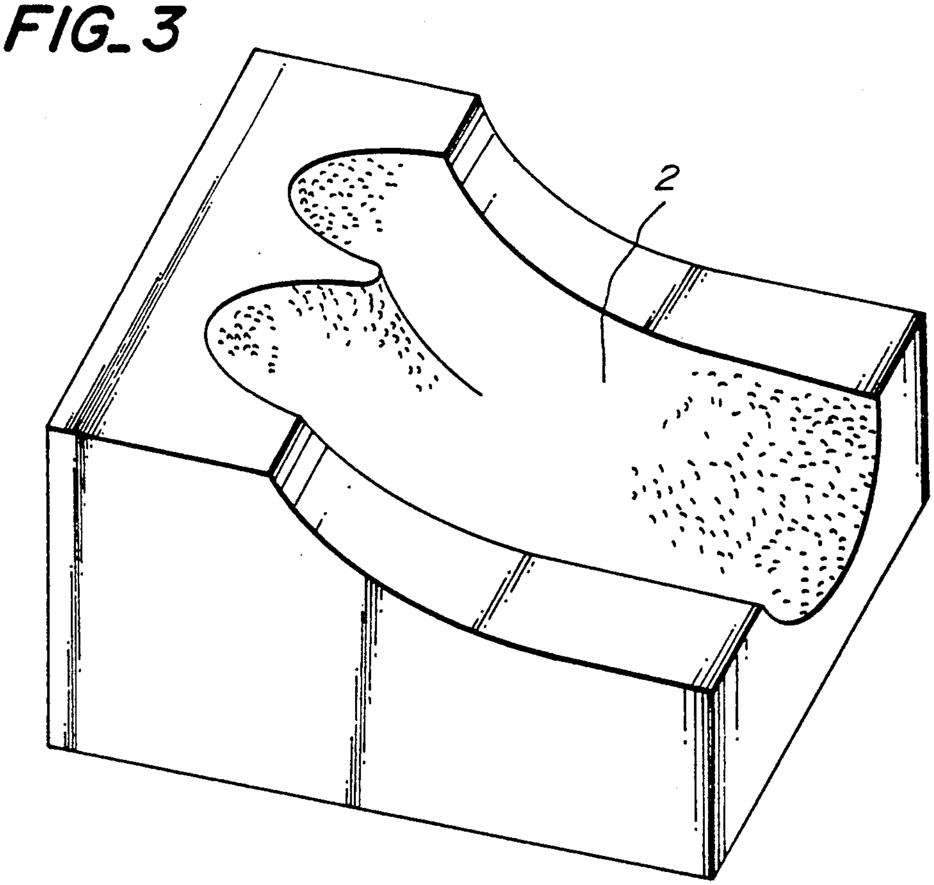
FIG. 3 is a perspective view illustrating a slip casting mold produced according to the present invention by the use of the mold illustrated in FIG. 2.
Figure 4:
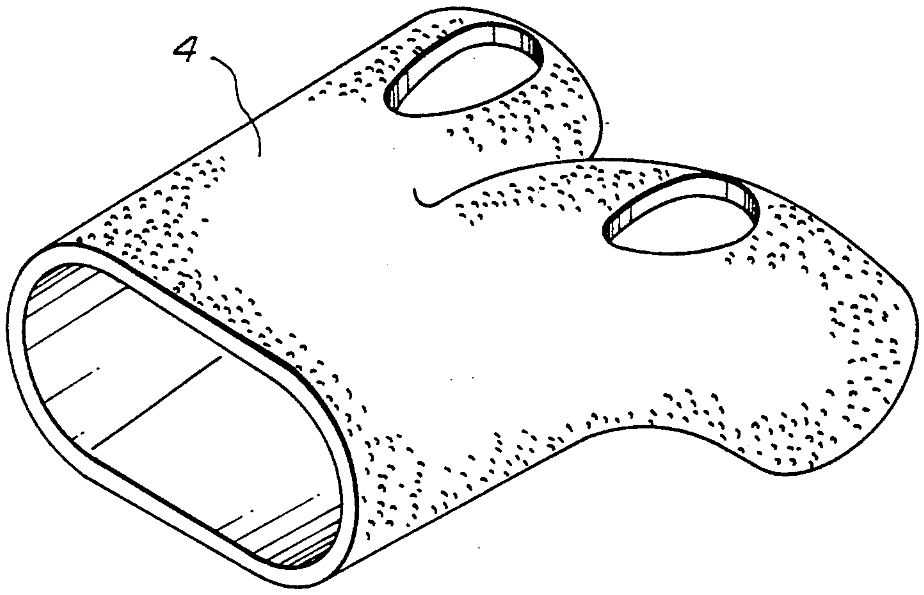
FIG. 4 is a perspective view illustrating a ceramic port liner produced according to the present invention by the use of the slip casting mold illustrated in FIG. 3.

When a slip casting mold 2 illustrated in FIG. 3 is produced according to an ordinary method by using the above obtained case mold 1 concurrently having a small dimensional dispersion and a large surface roughness, the resulting slip casting mold 2 has a mold area having a 10 point average surface roughness $R_z$ of at least 30 $\mu$m. As the materials of the slip casting mold 2, there are used gypsum and resin. When a ceramic raw material consisting mainly of, for example, aluminum titanate is poured into the interior of the above obtained slip casting mold 2 and molded into a green shaped article therein, and the resulting green shaped article is dried and then fired, a hollow ceramic article 4 for insert casting having a 10 point average surface roughness $R_z$ of at least 30 $\mu$m as illustrated in FIG. 4 can be obtained.

The hollow ceramic article 4 for insert casting produced according to the method of the present invention is small in the dimensional dispersion and does not experience the drawbacks caused in a conventional hollow ceramic article for insert casting having a surface treated by sandblasting. Moreover, when the hollow ceramic article 4 for insert casting produced according to the method of the present invention is insert cast in a cast metal, such as aluminum or the like, the ceramic article 4 has a high adhesion to metal and is free from the risk of peeling of the metal from the ceramic article 4. Accordingly, the stress concentration, which is apt to occur in the branched portion (concave portion) and the like of a hollow ceramic article 4 for insert casting, can be relaxed, and formation of cracks in the ceramic article 4 can be effectively prevented.

It is a matter of course that the present invention can be applied not only to the production of port liner, but also to the production of exhaust manifold liner, and the like.

The following examples are given for the purpose of illustration of this invention and are not intended as limitations thereof.

EXAMPLE 1

A phenolic resin adhesive was applied to the surface of a case mold, which had been obtained by transferring a master mold of port liner, by means of a spray gun to form a thin uniform layer of the adhesive on the case mold surface, and then abrasive grains having an average grain size of 60 $\mu$m were blown on to the case mold surface to form one layer of the adhesive grains thereon. A slip casting mold was produced from gypsum by the use of the above obtained case mold having the abrasive grain layer formed on its surface, and a ceramic port liner was produced by the use of the above obtained slip casting mold according to an ordinary method, and then the resulting green ceramic port liner was fired. The fired ceramics port liner had a 10 point average surface roughness $R_z$ of 60 $\mu$m and a dimensional dispersion of not larger than ±0.2 mm.

EXAMPLE 2

A ceramics port liner was produced in the same manner as described in Example 1, except that abrasive grains having an average grain size of 30 $\mu$m were used in place of those having an average grain size of 60 $\mu$m used in Example 1. The resulting fired ceramic port liner had a 10 point average surface roughness $R_z$ of 30 $\mu$m and a dimensional dispersion the same as that of the port liner obtained in Example 1.

COMPARATIVE EXAMPLE

A slip casting mold made of gypsum was produced through an ordinary method by the use of a case mold obtained by transferring a master mold used in Example 1, and the mold area of the resulting slip casting mold was subjected to a sandblasting blast treatment, wherein abrasive grains of #46 size were blown on to its mold area by means of pressurized air kept under a pressure of 2.5 $kg/cm^2$. A ceramic port liner was produced by the use of the blast-treated slip casting mold, and the resulting green ceramic port liner was fired. The fired ceramic port liner had a 10 point average surface roughness $R_z$ of 58 $\mu$m. However, the dimension of each portion of the resulting ceramic port liner was 0.6 mm smaller in average than the given dimension, and the dimensional dispersion of the resulting ceramic port liner was as large as±0.5 mm based on the value of (given dimension—0.6 mm).

Although the present invention has been explained with respect to an embodiment, wherein a case mold is treated, it is a matter of course that the same effect as that attained by treating the case mold can be attained by treating the master model or master mold.

As described above, according to the present invention, granules are adhered to the surface of a mold to produce a mold having a 10 point average surface roughness $R_z$ of at least 30 $\mu$m, and the above treated mold is used in the production of a slip casting mold, whereby a hollow ceramic article having a large surface roughness can be obtained without increasing the dimensional dispersion. The hollow ceramic article produced by the above described method has a small dimensional dispersion, and moreover can relax the stress concentration during the insert casting, and hence the hollow ceramic article can be effectively prevented from being cracked.

Therefore, the present invention has solved the problems in the conventional method, and contributes highly to the development of industry.

What is claimed is:

1. A method for producing a slip casting mold to be used for the production of a hollow ceramic article for insert casting, comprising adhering granules to the surface of a mold, which surface corresponds to the surface shape of the hollow ceramic article for insert casting, the produce a surface treated mold having a 10 point average surface roughness $R_z$ of at least 30 $\mu$m, and producing the slip casting mold using the surface treated mold.

2. A method for producing a hollow sintered ceramic article for insert casting, comprising:

adhering granules to the surface of a mold, which surface corresponds to the surface shape of the hollow ceramic article for insert casting, to produce a surface treated mold having a 10 point average surface roughness $R_z$ of at least 30 $\mu$m;

producing a slip casting mold using the surface treated mold;

pouring a ceramic raw material into the slip casting mold to form a hollow green ceramic article;

removing the hollow green ceramic article from the slip casting mold; and firing the hollow green ceramic article to produce the hollow sintered ceramic article having a 10 point average surface roughness $R_z$ of at least 30 $\mu$m.

* * * * *